(No Model.) 6 Sheets—Sheet 1.
W. L. STEVENS.
ELECTRO MAGNETICALLY PROPELLED VEHICLE.

No. 394,735. Patented Dec. 18, 1888.

FIG. 1.

WITNESSES.
Frank B. Murphy.
Frank E. Hartley

INVENTOR.
William L. Stevens
By
Duncan, Curtis
and Page
Attys.

(No Model.) 6 Sheets—Sheet 3.

W. L. STEVENS.
ELECTRO MAGNETICALLY PROPELLED VEHICLE.

No. 394,735. Patented Dec. 18, 1888.

WITNESSES.
Frank B. Murphy.
Frank E. Hartley.

INVENTOR.
William L. Stevens
By Duncan Curtis & Page
atty (No Model.) 6 Sheets—Sheet 4.

W. L. STEVENS.
ELECTRO MAGNETICALLY PROPELLED VEHICLE.

No. 394,735. Patented Dec. 18, 1888.

WITNESSES.
Frank B. Murphy.
Frank E. Hartley.

INVENTOR.
William L. Stevens
by
Duncan, Curtis & Page
attys.

(No Model.)  6 Sheets—Sheet 5.

W. L. STEVENS.
ELECTRO MAGNETICALLY PROPELLED VEHICLE.

No. 394,735.   Patented Dec. 18, 1888.

WITNESSES.
Frank B. Murphy.
Frank C. Hartley.

INVENTOR.
William L. Stevens
By Duncan, Curtis & Page
Attys.

(No Model.) 6 Sheets—Sheet 6.

W. L. STEVENS.
ELECTRO MAGNETICALLY PROPELLED VEHICLE.

No. 394,735. Patented Dec. 18, 1888.

FIG. 15.

WITNESSES.
Frank O. Murphy.
Frank E. Hartley.

INVENTOR.
William L. Stevens
By Duncan, Curtis & Page
Attys.

UNITED STATES PATENT OFFICE.

WILLIAM L. STEVENS, OF BOSTON, MASSACHUSETTS.

ELECTRO-MAGNETICALLY-PROPELLED VEHICLE.

SPECIFICATION forming part of Letters Patent No. 394,735, dated December 18, 1888.

Application filed April 19, 1888. Serial No. 271,138. (No model.)

*To all whom it may concern:*

Be it known that I, WILLIAM L. STEVENS, a citizen of the United States, residing at Boston, in the county of Suffolk and State of Massachusetts, have invented certain new and useful Improvements in Electro-Magnetically-Propelled Vehicles, of which the following is a specification, reference being had to the drawings accompanying and forming a part of the same.

This invention pertains generally to electro-magnetically-propelled vehicles, and more particularly to those which carry the electrical generator or batteries which produce or afford the current for operating the motor.

In describing my invention I shall refer exclusively to street-cars which carry a battery of secondary or storage cells, which at intervals require to be charged from a generator. I would not, however, be understood as limiting myself to this particular system, for in lieu of storage-batteries I may use primary or voltaic batteries, and as to the apparatus which I shall herein describe it will be apparent to one skilled in the art that in many respects it may be used for or adapted to such cars as receive the current from a stationary generator in any of the ways now known.

In my present invention my aim has been to secure a street-car capable of being propelled economically, safely, and with an easily-controlled power that insures a reasonable speed on all the ordinary levels, grades, and curves of a municipal or suburban track, and these conditions I have realized by apparatus the capabilities of which are limited only by the size of the motors and number of battery-cells which it is found practicable to carry. Without reference, then, to the various applications of the apparatus which forms the invention, nor to the purely mechanical devices—such as speed-reducing and running gears—I shall describe the devices for starting, stopping, reversing, regulating, and controlling the motor through the agency of electrical energy. These devices I have classified according to their special functions, and in order to avoid complication I shall describe each independently as far as practicable, pointing out in the claims those features which I regard as the novel and the essential parts of my invention.

Referring to the accompanying drawings.

Let A represent any suitable vehicle—such as a street-car—by which a suitable number of primary or secondary battery-cells, B, is carried. I prefer to place the batteries under the seats of the car, as indicated.

Under the car-body is secured in any proper manner an electro-magnetic motor, A', connected by a belt, A'', or otherwise, with the drivers $a$, either directly or through suitable reducing-gears.

The commutator of the motor is provided with four brushes, $b'\ b'\ b''\ b''$, mounted on a tilting frame, $c$, which is adapted to be shifted by a rod, $a''$, supported under the car, and which is shifted from either end of the car. This is an ordinary form of mechanism for reversing the direction of a motor, and any other may be substituted for it.

I place under the floor of the car the switches for controlling the movements of the motor. These consist, essentially, of a main or current-controlling switch and what I term a "speed-switch," the functions of which will be hereinafter more fully described. In practice I may use two main and two speed switches, in order to reduce the wear upon the switches which takes place when using one switch for running in both directions. In the drawings, however, and mainly with a view to avoiding complication, I have shown one main switch, but two speed-switches. Assuming that these switches, like most ordinary current or circuit controllers, contain a stationary part with terminals and a movable part with other terminals that are to be brought into certain relations with each other, I employ for imparting thereto the necessary movements the devices shown in Figs. 2, 7, and 8.

Figure 1:
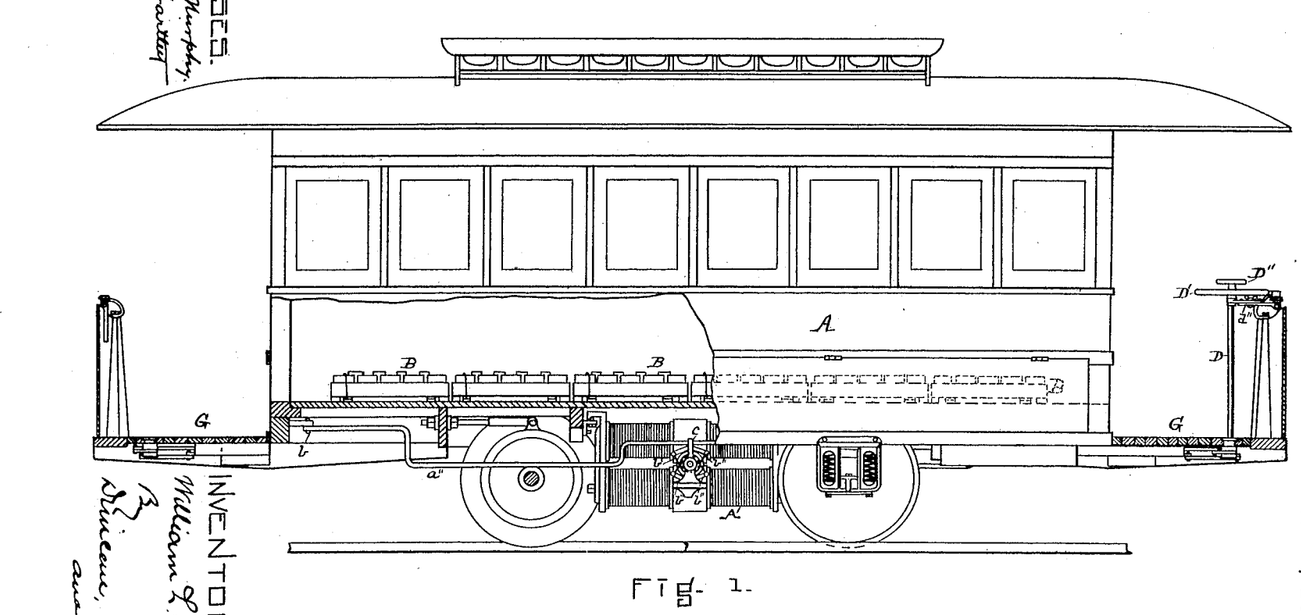
Figure 1 is a view, partly in section and partly in side elevation, of a street-car equipped with apparatus constructed in accordance with my invention.
Figure 2:
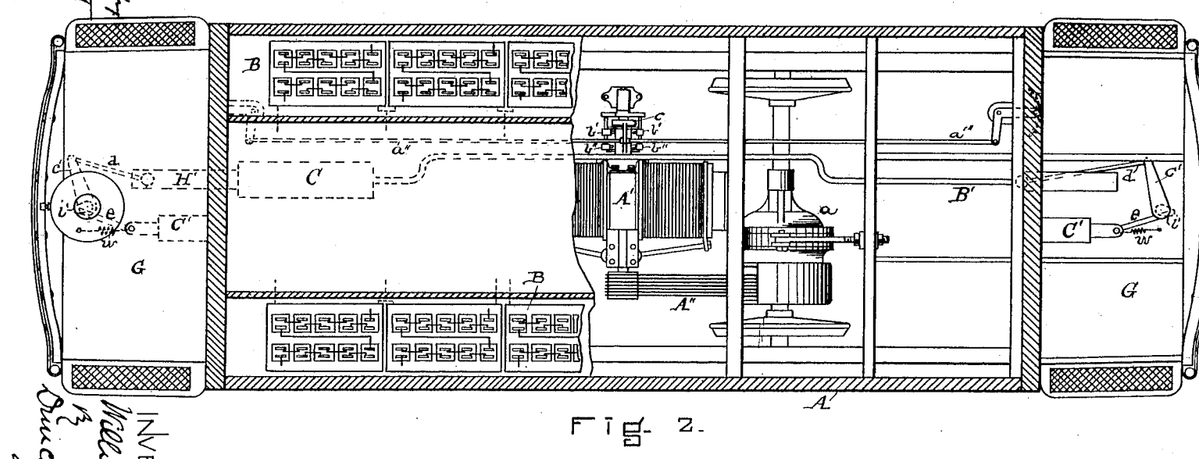
Fig. 2 is a horizontal section through a car, a portion of the bottom being removed to exhibit the motor and motion-transmitting devices, under the car-body.

In Fig. 2, C represents the main switch, and C' the speed-switches. When one main switch is used, the movable part or element is shifted from one platform by a crank-arm, c', and connecting-rod d, and from the other by a rod, B', connecting-rod d, and crank-arm c'. The speed-switches are shifted or controlled by connecting-rods e and crank-arms i'.

Figures 7, 8:
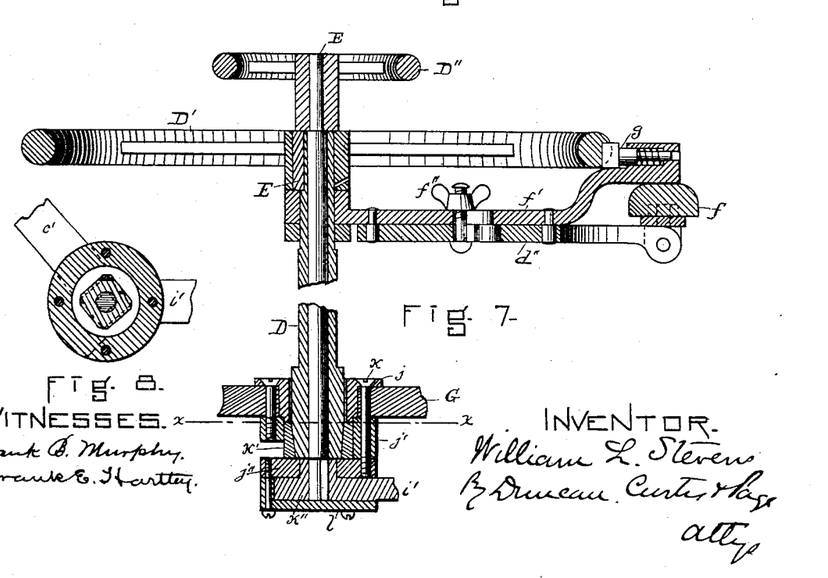
Fig. 7 is a vertical central section of mechanism for operating the switches.
Fig. 8 is a section on line $x\ x$ of Fig. 7.

In Figs. 7 and 8 the apparatus which I use for operating the crank-arms independently is shown. In each platform G is a metal bushing, j, held in position by screws k, which serve, also, to support the ring j' and the washer j'' and to secure them to the under side of the platform. The ring j' is slotted or cut away, as shown in Fig. 7 and indicated by dotted lines in Fig. 8, through which projects the crank-arm c' from a hub, k'. The other crank-arm, as i', projects from a hub, k'', held in place by the slotted box l.

D is a tubular stem with a somewhat tapered or squared end, which fits down through the bushing into a seat formed in the hub k' of the crank. The tapered portion of the stem being squared, and the seat in the hub k' being of corresponding shape, the crank will be turned by a rotary movement of the stem. To the upper end of stem D is secured a hand-wheel, D'.

When the stem is inserted into the bushing, it is supported firmly in a vertical position by an arm, d'', hinged to the dasher or hand-rail and secured by a suitable screw or clamp, f'', to an arm, f', extending at right angles from the stem D.

The end of arm f' is provided with a spring-catch, g, which is adapted to enter notches cut in the periphery of the hand-wheel D' with sufficient effect to retain the wheel in position against any tendency to shift imparted to it by the jolting of the car. The notches may be placed in positions to correspond with the different positions of the switch-contacts which are the best for stopping, starting, or in other ways controlling the movements of the car.

Through the hollow center of the stem D is passed a small round rod or stem, E, the extreme lower end of which is squared and enters a seat of corresponding shape in the hub k'' of crank i', so that the said crank is turned independently of the others.

To the cranks i', or to the movable parts of the speed-switches controlled thereby, are connected springs w w, which are distended when the speed-switch is turned. These springs serve to automatically shift the speed-switches back to their normal position when released. The object of this will be hereinafter more fully described.

As above stated, the main switch is operated and controlled by the manipulation of the hand-wheel D', which moves the crank c', while either one of the speed-switches is independently controlled by the manipulation of the small wheel D'', which is secured to the stem E, and which turns one of the cranks i', according to the end of the car to which the hand-wheels are applied.

The function of what I term the "main switch" in my apparatus or system is to make or break the circuit between the generator and the motor, or to modify the current in a proper manner to secure as far as practicable the desired variations in power and speed of the motor. For example, the main switch might be caused to vary the resistance between the generator and the motor, or to vary the number of battery-cells in circuit with the motor, or in other ways to modify the character and effect of the current upon the motor. I prefer, however, to use a switch which is constructed in such manner as to vary the order of the connection of the battery-cells rather than their number, or, in other words, which in its movement will be capable of gradually changing the order of the connections of the cells with the motor from multiple arc to multiple series and series and conversely. These features, while not forming, broadly, a part of my invention, are illustrated and described in detail in order that the system as a whole may be better understood.

I may construct the switches proper in a great many different ways, the precise mechanical construction of the same being largely immaterial, the essential features being the relative arrangement or disposition of the contacts which will produce the desired combination of connections by the movement of one part or element of the switch with reference to the other. In illustration of the system or plan of electrical connections I have shown a switch involving a set of stationary contacts and a sliding carrier to which the other terminals are secured and which are reciprocated by the crank and connecting-rods above described.

Figure 3:
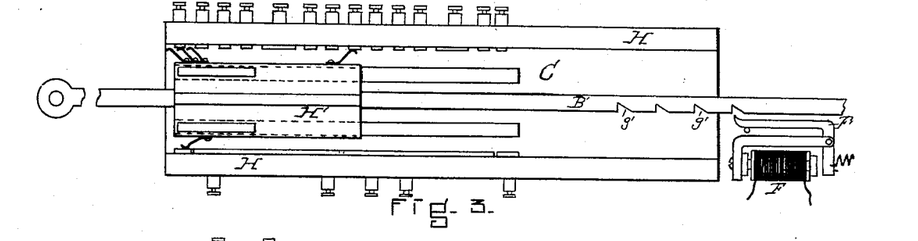
Fig. 3 is a plan view of the main or current-controlling switch mechanism.
Figure 4:
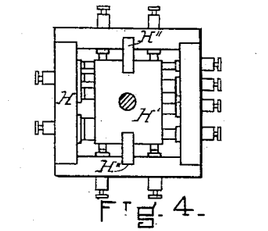
Fig. 4 is an end view of the same.

Referring, therefore, to Figs. 3 and 4, H is a box or case, the upper side being removed in Fig. 3, to which the stationary contacts or terminals are secured, and H' is the carrier which runs on the guides H''. This constitutes the main or current-controlling switch.

Figure 5:
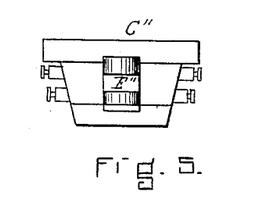
Fig. 5 is an end view of the speed-controlling switch.
Figure 6:
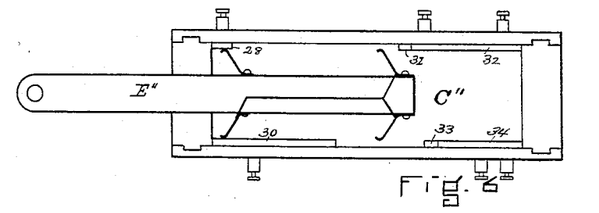
Fig. 6 is a plan view of the same.

In Figs. 5 and 6, which represent the speed-switch, C'' is the box or casing containing the stationary contacts, and E'' is the carrier or slide with the movable contacts.

Figure 10:
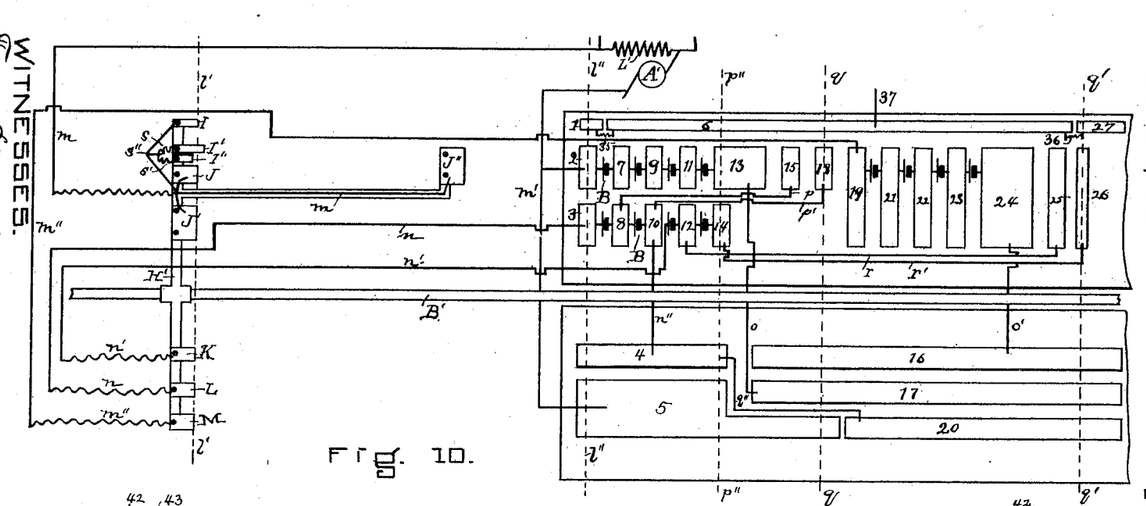
Fig. 10 is a diagram illustrating more in detail the connections and mode of operation of the main or current-controlling switch.

Referring now to Fig. 10, and leaving out of present consideration the connections with the speed-switches, the diagram shows the main-switch connections with the carrier H' shifted to a position in which the contact-strips are out of engagement entirely with all the stationary contacts. It may be stated that the carrier is shown in this position—that is to say, on the dotted line l' l'—in order to illustrate more clearly the plan of electrical connections; but in practice its normal position, or when the motor is stationary, would be on the line l'' l''. When in such position, no current will flow through the armature of the motor, the electrical condition being illustrated by the diagram Fig. 11, in which A' designates the armature and L' the field of the motor. The speed-switch, although illustrated in this figure and in Figs. 12, 13, and 14, may for the present be disregarded. The reason for this will appear from the following description of connections:

The numbers 2, 7, 9, 11, and 13 indicate five contact-plates, to which are connected in series four groups or trays of the main batteries. For convenience, assume that each group or tray contains ten cells in series. Plates 2 and 13 therefore form the terminals of a series of forty cells. In like manner forty cells are connected in groups of ten to the contact-plates 19, 21, 22, 23, and 24. Numbers 3, 8, and 10 designate other contact-plates between which two groups of ten cells are connected, and 12 and 14 plates between which is a single group of ten cells, while a similar group of ten cells is connected up between plate 12 and one of the brushes, as K, on the carrier. There are, therefore, in all, one hundred and twenty cells divided into twelve groups of ten cells each.

The carrier H' is provided with brushes I I' I'' J J' J'' K L M, the brush J'' being shown in a position in advance of the others, for reasons that will appear. When, therefore, the carrier is shifted to bring the bearing-surfaces of the main line of brushes in the position indicated by the line l'' l'', the brush J will rest upon plate 2, J' upon plate 3, K upon plate 4, and L and M upon plate 5; but brushes J, J,' and J'' are electrically connected together and to one terminal of the motor by means of conductor m, while the opposite terminal of the motor is, by means of the conductor m', connected with the plates 2 and 5, and, through the brushes L and M, resting upon plate 5, and the conductors m and m'', with the plates 3 and 19, respectively. Thus, both terminals of the motor being in electrical connection with but one pole or terminal of the batteries, no current flows and no action results.

Figures 11, 12:
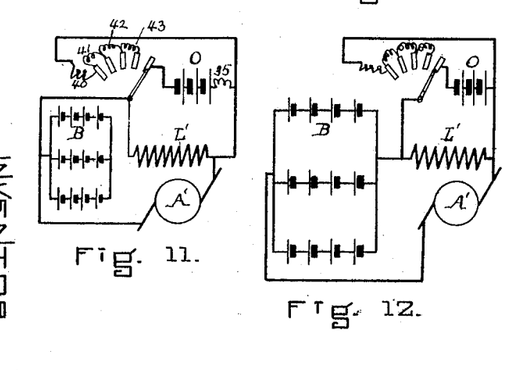
Figs. 11, 12, 13, and 14 are diagrams illustrating the order or condition of the connections of the main switch for different positions of the brushes or contacts of the main switch.

To start the motor in action, the carrier H' is moved forward to bring the brushes thereon successively in contact with the plates. The first effect produced by this forward movement is to establish contact between the following-named parts: brush J and plate 7, brush J' and plate 8, brush J'' and plate 21, brushes K and L and M remaining upon the strips 4 and 5, respectively. It is evident that by this means the groups of cells between plates 2 and 7, between 3 and 8, and between 19 and 21 will be introduced in parallel or multiple arc into the motor-circuit, since all the other connections remain as in the first-described position of the carrier. The further movement of the carrier forward, which brings brushes J J' J'' upon plates 9, 10, and 22, respectively, obviously adds in a similar manner to each branch of the circuit acting upon the motor one group of ten cells of battery. When the brushes J, J', and J'' have encountered plates 11, 12, and 23, respectively, three groups of thirty cells each have been brought into action upon the motor. The addition of the ten cells between plates 9 and 11 and those between 22 and 23 is effected in the same manner as before, while the group of cells between plates 10 and 12 is brought into circuit with those between plates 3 and 8 and 8 and 10 by means of the conductor n' from the said group of cells to the brush K and plate 4, and thence by a conductor, n'', permanently connecting plates 4 and 10. The next change is effected when brushes J J' J'' encounter the plates 13, 14, and 24 or reach the line p'' p''. This obviously brings into action all the cells by connecting them with the motor-circuit in three groups of forty cells each. This condition is illustrated in Fig. 12. The next change takes place when, by the further progressive movement of the carrier H', the brushes K and L have encountered the two plates 16 and 17, respectively. In the interval of this passage of these brushes from plates 4 and 5 to plates 16 and 17 the brush J' passes beyond plate 14 on to insulation, while brushes J and J'' remain in contact with plates 13 and 24, which are made of sufficient width to permit such movement without interrupting the connections.

It will be noted that plate 13 is permanently connected to plate 17 by conductor o, and that plate 24 is similarly connected by conductor o' to plate 16; hence this movement has produced the following changes: Plate 3, which while brush L rested upon plate 5 was connected to the motor-circuit in parallel with plates 2 and 19, is now thrown out of action and connected by conductor n, brush L, plate 17, and conductor o to plate 13. Moreover, the group of cells connected, respectively, to the brush K and plate 12, which while brush K remained on plate 4 was connected through the conductor n'' to plate 10, is now connected through conductor n', brush K, plate 16, and conductor o' to plate 24. At this moment, therefore, but two series of forty cells each will be connected in multiple arc with the motor.

When the brushes J and J'' have encountered plates 15 and 25, respectively, from the conditions just described it is evident that one group of ten cells will be added to each of the two series of forty cells already in circuit.

Figure 13:
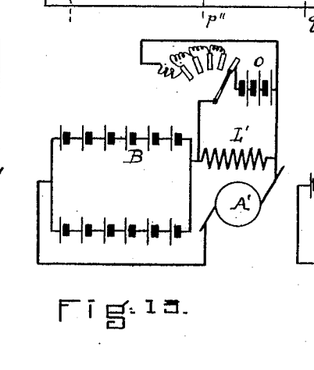

If the carrier be then shifted to bring brushes J and J″ into contact with plates 18 and 26, respectively, or on line $q\ q$, one of the remaining groups of ten cells will be added to each of the series of fifty cells in action. This occurs by reason of the fact that plates 15 and 18, by means of conductors $p\ p'$, are respectively connected to plates 8 and 10, between which one of the groups of cells is included, and plates 25 and 26 similarly connected by conductors $r\ r'$ to plates 12 and 14, between which the other group of cells is included. All of the cells will thus be brought into action in two series of sixty cells each, as represented in Fig. 13. The next change is effected by the further progressive movement of the carrier H′, which transfers the brush M from plate 5 to plate 20. By this movement plate 19, which so long as brush M remained on plate 5 was connected to the motor-circuit, first in multiple arc with plates 2 and 3 and next with plate 2 alone, is connected by conductor $m''$, brush M, plate 20, conductor $q''$, plate 4, conductor $n''$, plate 10, and conductor $p'$ with plate 18; but at the same time brush J passes onto plate 19, while brush J″ passes from plate 26 on to insulation. One series of sixty cells, or those now included between plates 2 and 19, will therefore remain in action, while the other cells are connected in series between plates 19 and 26, but are out of action.

Figure 14:
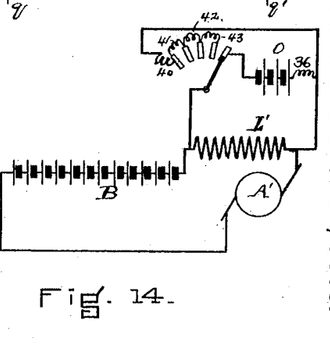

It will be noted that strips 19, 21, 22, 23, 24, and 26 are of double width, so that they lie in the path of both of the brushes J and J′ and are encountered by both simultaneously in their further movement. This is done with a view to securing a better electrical connection or contact, for brushes J and J′, being electrically connected, form practically one wide contact strip or brush. The next change is effected by a forward movement of the carrier, which brings brushes J and J′ into engagement with plate 21. This obviously adds the group of ten cells included between plates 19 and 21 to the series of sixty cells already in action, and the further movement of the carrier in like manner adds ten additional cells to the series in action for each successive plate encountered by the brushes J J′ until said brushes reach the final plate, 26, when all of the one hundred and twenty cells are connected in series with the motor, as shown in Fig. 14. While with this arrangement the switch-carrier may be shifted to any intermediate position, it is desirable, in order that all the cells may be equally drawn upon, that the brushes be maintained at one or another of the positions indicated by the lines $l''\ l''$, &c., and at which the corresponding electrical connections will be as shown in Figs. 11 to 14, inclusive.

On the carrier H′ are supported two supplemental brushes, I′ and I″, which are designed to maintain the motor-circuit constantly closed during the shifting of the main brushes from strip to strip. This is accomplished by using brushes of unequal length, which are connected together and to the main brushes J, J′, and J″ through connections of suitable resistance.

The lengths of the brushes and their position relatively to that of the main brushes are such as to maintain a lapping connection between two adjacent plates during the instant of time in which the main brushes are passing from any one of the plates to that next adjacent. I would here state that the contact-surfaces of what I have herein designated the brushes J J′, &c., are made as wide as they may safely be without actually spanning and short-circuiting adjacent plates in passing across the intervening insulation or space.

The letters $s\ s'$ indicate the resistance-circuits between the brushes I′ I″ and the branched conductor $s''$, which establishes connections to each of the brushes J J′ J″. In illustration of the action of the supplemental brushes, assume the carrier to be in position to maintain the main brushes on plates 7, 8, and 21 and to be then shifted to bring the brushes onto the next set of plates. The relative lengths of the main and supplemental brushes are such that just before brush J breaks contact with plate 7 brush I′ comes into contact with plate 9, and the moment after brush J reaches plate 9 the brush I″ breaks contact with plate 7. The special advantage of using the two supplemental brushes resides in the opportunity which they afford of utilizing both resistances $s\ s'$, for it will be observed that at every passage of the main brushes from strip to strip a group of cells is momentarily short-circuited through the supplemental brushes and the two resistances $s\ s'$ in series, but that the current to the motor from the cells already in circuit has only one-half of the resistance to overcome.

There is also on the carrier H′ a brush, I, electrically connected to the main brushes. This brush has a special function in connection with what I designate the "speed-switch," which will be understood by reference to Fig. 15, in which the brushes are advanced to the position corresponding to the line $p''\ p''$ in Fig. 10. In this figure N and N′ represent metallic contact-levers, on one side of which are two plates, 28 and 29, and on the other a given number of plates, as 30, 31, 32, 33, and 34, adapted to be successively brought into contact with the lever N or N′ by the movement of the said lever. The normal position of the levers is, as shown, on both plates 28 and 29.

From brush I electrical connection is maintained to one terminal of the motor field-coil through conductors $s''$ and $m$. In the path of movement of brush I are three plates, 1, 6, and 27, plates 1 and 27 being very much shorter than plate 6 and connected to it through resistances 35 and 36 in order to prevent, as will hereinafter appear, the discharge from the motor field-coils from burning the contact-surfaces when the brush I is shifted out of contact with plate 6.

Between plate 6 and the opposite terminal of the motor field-coil a group of cells, O, is included, the electrical connections being maintained by means of conductors 37, 38, and 39, plates 28 and 29, and the switch-levers N and N'. These supplemental cells thus maintained under normal conditions in circuit with the field when the motor is in action tend to impart to the field the same polarity as the main battery.

Around the field-coils L' of the motor is a series of resistances, 40, 41, 42, and 43, to be used for shunting more or less of the energizing-current around the field. In the present instance, where two switches at opposite ends of the car are shown for controlling these resistances, the conductor 44 connects one side of the field-circuit with both plates 30. The remaining plates, 31, 32, 33, and 34, are connected across by conductors 45, 46, 47, and 48, repectively. Resistances 41, 42, and 43 are included between the conductors 45 to 48, as shown, and resistance 40 is between the opposite side of the field-circuit and conductor 41.

Normally, as above stated, the position of the levers N N' maintains electrical connection between the plates 28 and 29. The first effect of shifting the carrier to start the motor is to bring the supplemental cells O into action upon the motor-field. This condition of things remains unaffected by the further manipulation of the main switch until the brush I is shifted to either of its extreme positions. If, however, it becomes desirable at any time to increase the speed of the motor beyond the rate determined by any given position of the main switch, one of the levers, N or N', is shifted out of contact with plates 28 and 29 onto two or more of the other plates of the speed-switch. This is effected, as hereinbefore set forth, by turning the small hand-wheel D". The first result of this shifting is to open the circuit of the supplemental cells O, while the further movement of the lever by connecting plate 30 successively with the plates 31 to 34 shunts the current around the field of the motor, reducing the strength of the field and producing in consequence an increase in the speed of rotation of the armature. This effect, as is well known, is due to lowering the counter electro-motive force of the motor armature by weakening the strength of the field in which it rotates. The rate of speed is obviously controlled by the number of resistances cut out by the speed-switch.

The main advantages in the use of this supplemental or speed switch in conjunction with the main switch are as follows: First, it is desirable, as I have before stated, to utilize by some order of connections all the battery-cells simultaneously in order that they may be equally drawn upon; but as the number of possible combinations of all the cells is limited, and also involves considerable complication in the switch mechanism, by the use of the speed-switch, which varies the counter electro-motive effect of the motor without varying the number or arrangement of cells, all intermediate speeds may be obtained; secondly, the motor is geared to the driving axle or axles of the car, so that the normal rate of speed will be secured by the most economical speed of the motor for the battery-power used; but it is often desirable to make up lost time or to run at a higher speed for some other reason, in which case the speed-switch is advantageously used, although the motor may not be actually running under the most economical conditions.

The main object of the use of the supplemental cells O is to enable the energy to be stored which would otherwise be expended in stopping the car or wasted by the running of the car down a grade. In illustration of this, suppose the car while running at its normal speed is to be stopped. The main switch is shifted to reduce the number of cells in series acting upon the motor. If the field of the motor were permanently magnetized, it is evident that as soon as the electro-motive force of the battery fell below that produced by the motor at its normal speed the motor would act as a generator and charge the cells; but in my system, where I employ a series-wound machine, a reduction of the electro-motive force of the battery is followed by a reduction in the intensity of the field. In order, therefore, to prevent the magnetism of the field from being reduced to zero by the lowering of the electro-motive force of the battery and the tendency of the motor when running to reverse its own field, I employ the supplemental battery O, which imparts to the field of the motor sufficient magnetism to cause it to run as a generator and charge the battery when either the electro-motive force of the battery is slightly reduced or the speed of the motor accelerated by the motion of the car downgrade. This evidently acts as a brake, either to stop the car or to prevent its too rapid motion on a downgrade. The number of supplemental cells used in this way will depend upon the resistance of the field-circuit and the current strength normally used in running the motor. I have found in practice that good results are obtained by the use of three supplemental cells with a motor, the resistance of the field-circuit of which was about three-tenths of an ohm, and which was operated by one hundred and twenty cells similar to the supplemental cells; but I have reason to think that the number and arrangement of the supplemental cells which will yield the best results in particular cases are most easily determined by experiment. These cells do not require recharging as frequently as the main-battery cells, for the reason that they will be found at times to receive charge from the main battery. The use of these supplemental cells enables me to use a series-wound motor, which is preferable in cases of this kind, for the reason mainly that it starts far better under a load than the shunt-wound type of motor. The addition of the supplemental cells, moreover, enables me to stop the car as readily as with a shunt-wound motor and to charge back into the batteries, or in case the battery be stationary and the current conveyed to the motor to charge back to line.

The electrical conditions of the speed-switch with reference to the main switch at the various positions of the latter will now be understood by reference to Figs. 11 to 14. In Fig. 11 the supplemental battery is included in the field-circuit through the resistance 35, brush I being in contact with plate 1. In Figs. 12 and 13 the battery O is directly in circuit with the field, while in Fig. 14, which represents the conditions in which brush I rests upon plate 27, the resistance 36 is brought into circuit with the battery O. This reduces somewhat the magnetic strength of the field and enables the motor to run at a slightly-greater speed than it otherwise would.

In practice the speed-switch, as I have now described it, performs a useful function in the operation of stopping the car. The movable part of the switch is retracted, as above set forth, by spring $w$, so that when turned and then released it will suddenly shift back to its normal position. This property I take advantage of in the following manner: To stop the car, the guard turns both switches together until the point is reached where the motor should charge back into the battery. The speed-switch is then released, and, returning to its normal position, throws the supplemental cells into the motor field-circuit. As the first movement of the speed-switch cuts out the supplemental cells from the field-circuit, it will be seen that the current of both the main and supplemental batteries is withdrawn from the motor, so that there will be no injurious sparking at the main switch; but as soon as the electro-motive force of the battery is reduced by changing the order of the connection of its cells from series to multiple arc to a point at which the motor, propelled by the momentum of the car, would charge back into the battery if it were not inert by the withdrawal of energizing-currents the speed-switch is released, and, being automatically retracted, it throws in the field-cells again.

Figure 9:
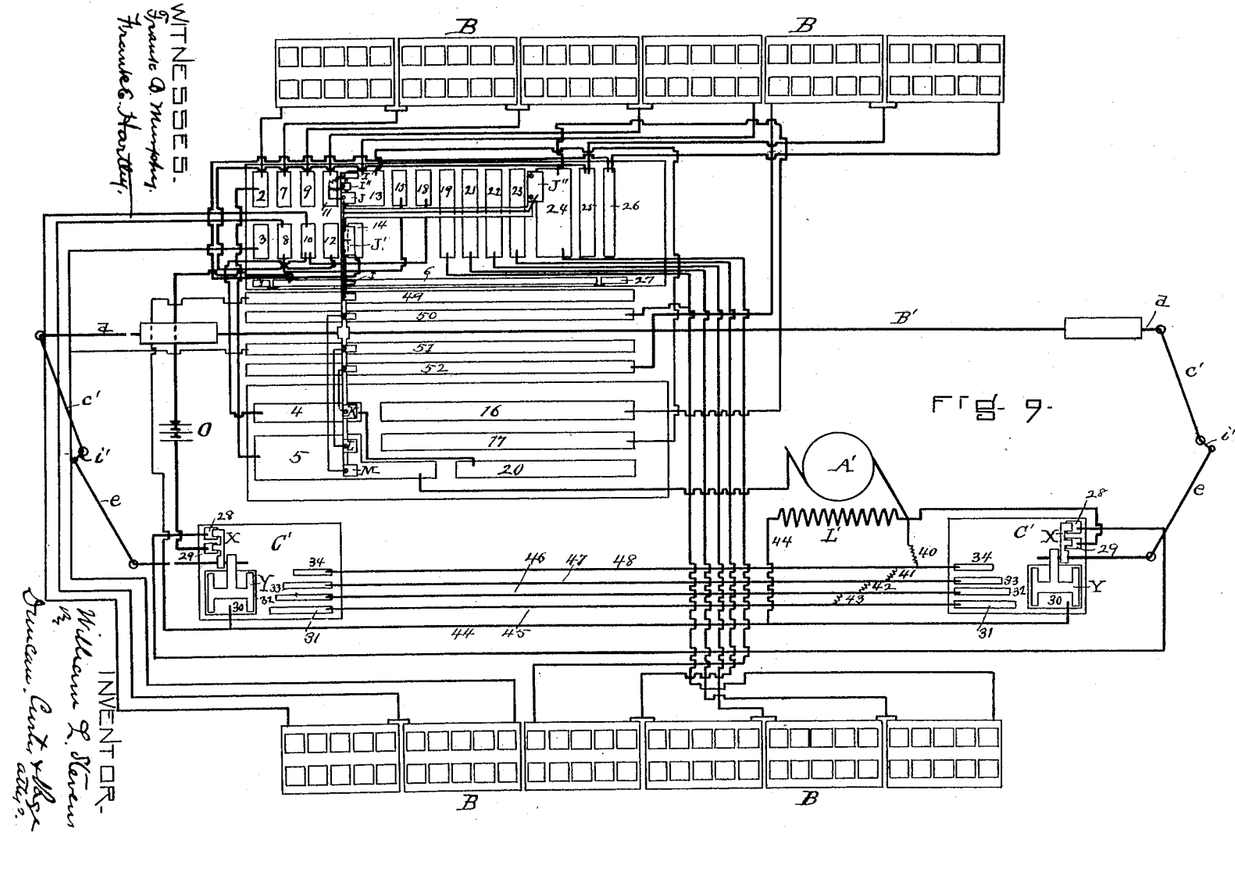
Fig. 9 is a diagram illustrating the electrical connections between the batteries, switches, and motor.

Referring now to Fig. 9, all the essential details being designated by similar letters and characters to the corresponding parts in the other figures, the diagram will be readily understood. It may be stated that the bar $e$ of the speed-switch carries two contact-plates, X Y, insulated from each other. The plates 28 and 29 are connected by the plate X, and plate 30 is connected with one or more of the plates 31, 32, 33, and 34 by the contact-plate Y.

It will also be observed that in Fig. 9 four long plates are shown in the switch and designated 49, 50, 51, and 52. They serve merely to maintain the same electrical connections that are made through the conductors $m$, $m''$, $n$, and $n'$ of Figs. 10 and 15, to which they respectively correspond. In the two figures named these conductors are assumed to include flexible portions, as indicated, which maintain the connections with the movable brushes. In Fig. 9 these parts are replaced by the long strips.

Figure 15:
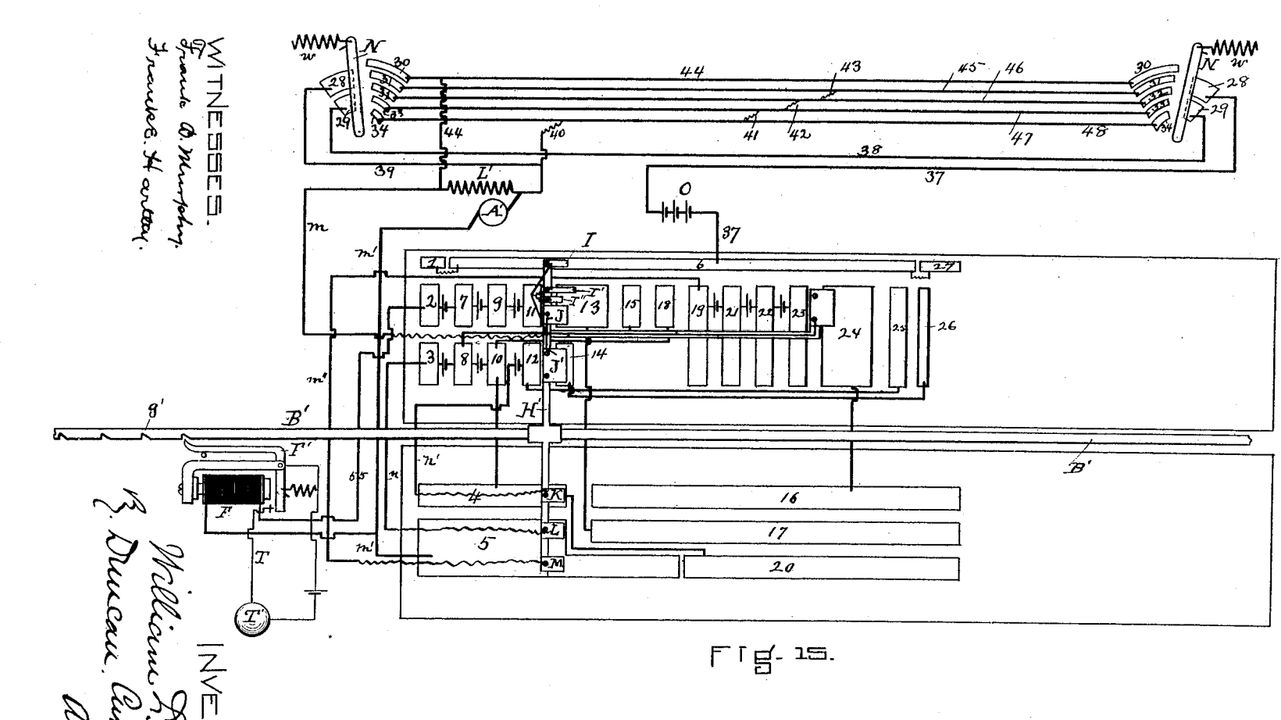
Fig. 15 is a diagram illustrating in another way the plan of connections between the main and two speed switches.

In Figs. 3 and 15 is shown an auxiliary appliance which serves as a safety device.

To prevent the person in control of the car from permitting an excess of current to be drawn from the batteries, as might occur by turning the main switch too rapidly in starting or in increasing the speed of the car, I employ a magnet, F, with an adjustable armature, F'. This magnet is included in a circuit, 55, between the plate 2 and one terminal of the motor. When any current is flowing from the main batteries to the motor, either from all the coils in series or from the two or three groups in multiple arc, the magnet F will be energized. Its armature is so adjusted that it will not be moved by any current at or below the normal; but should the current strength exceed the normal limit it will be caused to engage with one of the notches $v$ in the switch-bar B' and prevent the further movement of said bar until the counter electro-motive force of the motor has risen sufficiently to reduce the current to the normal. I also use with the magnet a local circuit, T, containing a bell, T', and which is closed by the movement of the armature F' toward the magnet. This gives intimation to the guard or attendant when the current is too strong. I employ this device in place of the current indicators or ammeters commonly used.

The practical importance of this system or combination of appliances devised by me depends largely upon the employment of the series-wound motor with the storage-battery and the means by which its regulation and control are effected. No means, so far as I am aware, have heretofore been devised for causing such a motor to charge back into the battery when the car is stopping or running without the battery-current.

I do not claim herein, broadly, the combination of a main and a speed switch—that is to say, of a switch that varies and controls the current supplied to the motor and a switch that varies the intensity of the magnetic field of the motor; nor do I broadly claim in this application the method of operating these switches which I have herein described.

What I desire to secure by Letters Patent is—

1. The combination, in an electro-magnetically-propelled car, with a series-wound motor and a main battery or source of current for driving the same, of a supplemental battery and switch for connecting the same with the field-circuit of the motor, as set forth.

2. The combination, in an electro-magnetically-propelled vehicle, of a series-wound motor, a main battery for supplying the current to run the motor, a main switch for controlling and varying the current supplied by the battery, a speed-switch adapted to vary the strength of the field-magnets of the motor, and a supplemental battery adapted to be connected with and disconnected from the field-coils of the motor by the switches, as herein set forth.

3. The combination, with the motor, of a main and speed switch having rotary handles or devices for manipulating the same mounted concentrically, as set forth.

4. The combination, with a car or other vehicle and a driving electro-magnetic motor mounted thereon, of manual switches adapted, respectively, to vary and control the current supplied to the motor and to vary the magnetic intensity of the field of the motor, the latter or speed switch being automatically retractile to its normal position, as herein set forth.

5. The combination, with the main contact-brushes mounted in an insulating-carrier and the series of battery-terminal plates in position to be successively encountered by the said brushes, of independent supplemental brushes adapted to maintain contact between two adjacent plates during the interval of the passage of the main brushes from one to the other, and resistance-circuits connecting said supplemental plates to the main plates, as herein described.

6. The combination, with the series-wound motor of an electrically-propelled car, of a battery of a comparatively small number of cells normally included in the field-circuit only of the motor while the car is running and acting to impart to the field the same magnetism as the main battery, as and for the purpose set forth.

7. The combination, with the main contact-brushes mounted in an insulating-carrier and the series of battery-terminal plates in position to be successively encountered by the said brushes, of independent supplemental brushes adapted to maintain contact between two adjacent plates during the interval of the passage of the main brushes from one to the other, and resistance-circuits connecting said supplemental plates to the main plates, as herein described.

8. The combination, with the series-wound motor of a car, of a supplemental battery in the field-circuit and a resistance adapted to be inserted in the circuit with said battery, as and for the purpose set forth.

9. The combination of the series-wound motor, the main switch controlling the current to the motor, the speed-switch for varying the magnetic couple of the motor, and the supplemental battery in a circuit including the field-coils of the motor and adapted to be controlled by the main and speed switches, as and for the purpose set forth.

10. In an electro-magnetically-propelled vehicle, the combination of a secondary or storage battery, a series-wound electro-magnetic motor, and switch mechanism for directing a current independent of the main or driving current through the field-circuit only of the motor in the same direction as the main current, as and for the purpose set forth.

11. The combination, with a car or other vehicle and a series-wound electric motor mounted thereon, of a secondary or storage battery carried by the car, a switch for varying and controlling the current supplied to run the motor, and means for maintaining the normal magnetism of the motor-field when the battery-current is interrupted or reduced, whereby the motor may be caused to charge back into the battery when the electro-motive force produced by the battery has fallen to a given point, as set forth.

WILLIAM L. STEVENS.

Witnesses:
FRANK G. PARKER,
MATTHEW M. BLUNT.